US011364484B2

(12) United States Patent
Fisher et al.

(10) Patent No.: US 11,364,484 B2
(45) Date of Patent: *Jun. 21, 2022

(54) MANGANESE OXIDE-LANTHANUM MANGANATE-PGM COMPOSITES FOR TWC APPLICATIONS

(71) Applicant: JOHNSON MATTHEY PUBLIC LIMITED COMPANY, London (GB)

(72) Inventors: Janet Fisher, Reading (GB); Andrea Eva Pascui, Reading (GB)

(73) Assignee: Johnson Matthey Public Limited Company, London (GB)

(*) Notice: Subject to any disclaimer, the term of this patent is extended or adjusted under 35 U.S.C. 154(b) by 272 days.

This patent is subject to a terminal disclaimer.

(21) Appl. No.: 16/837,085

(22) Filed: Apr. 1, 2020

(65) Prior Publication Data
US 2020/0316568 A1 Oct. 8, 2020

Related U.S. Application Data

(60) Provisional application No. 62/830,431, filed on Apr. 6, 2019.

(51) Int. Cl.
*B01J 23/00* (2006.01)
*B01J 23/34* (2006.01)
(Continued)

(52) U.S. Cl.
CPC ............ *B01J 23/44* (2013.01); *B01D 53/945* (2013.01); *B01J 23/002* (2013.01); *B01J 23/34* (2013.01);
(Continued)

(58) Field of Classification Search
CPC . B01J 23/002; B01J 23/34; B01J 23/44; B01J 27/232; B01J 35/0013;
(Continued)

(56) References Cited

U.S. PATENT DOCUMENTS 4,988,660 A * 1/1991 Campbell ............ B01J 23/8892
502/302
5,380,692 A 1/1995 Nakatsuji et al.

OTHER PUBLICATIONS

Shafi, P.M., et al., "One-Pot synthesis of LaMnO3/Mn3O4 Nanocoposite: Impact of Calcination Temperature on the Synergetic Effect Towards High Energy Supercapacitor Performance"—ChemistrySelect, 2018, 3, 6459-6467.

(Continued)

*Primary Examiner* — Cam N. Nguyen

(57) ABSTRACT

The present disclosure is directed to compositions for use in oxygen capture applications, for example in three-way catalysts (TWC) systems. In some embodiments, the compositions comprise composites of aggregated and/or fused primary particles, the aggregated and/or fused primary particles collectively having the formulae $[MnO_x]_{:y}:[La_zMnO_3]_{1-y}$; wherein x is in a range from about 1 to 2.5;
y is in a range from about 1 to about 30 wt %, or from about 1 to about 20 wt % or from about 2-10 wt % or from about 2 to about 5 wt %; and z is about 0.7 to about 1.1; and the $La_zMnO_3$ is a crystalline perovskite phase; the aggregated and/or fused primary particles of the composite having a mean surface area in a range of from about 25 to about 60 $m^2/g$, preferably from about 27 to about 45 $m^2/g$. In preferred embodiments, these compositions further comprise low levels of at least one platinum group metal (PGM), preferably Pd.

14 Claims, 8 Drawing Sheets

(51) Int. Cl.
*B01J 23/44* (2006.01)
*B01J 27/232* (2006.01)
*B01J 35/00* (2006.01)
*B01J 35/10* (2006.01)
*B01J 37/02* (2006.01)
*B01J 37/03* (2006.01)
*B01J 37/08* (2006.01)
*F01N 3/28* (2006.01)
*F01N 3/10* (2006.01)
*B01D 53/94* (2006.01)
*B01D 21/00* (2006.01)

(52) U.S. Cl.
CPC ......... *B01J 27/232* (2013.01); *B01J 35/0013* (2013.01); *B01J 35/1014* (2013.01); *B01J 37/0221* (2013.01); *B01J 37/031* (2013.01); *B01J 37/088* (2013.01); *F01N 3/101* (2013.01); *F01N 3/28* (2013.01); *B01D 21/0069* (2013.01); *B01D 2255/1023* (2013.01); *B01D 2255/2063* (2013.01); *B01D 2255/402* (2013.01); *B01D 2255/908* (2013.01); *B01D 2255/9207* (2013.01); *F01N 2370/02* (2013.01); *F01N 2510/00* (2013.01)

(58) Field of Classification Search
CPC .. B01J 35/1014; B01J 37/0221; B01J 37/031; B01J 37/088; F01N 3/28; F01N 3/101; B01D 53/945
See application file for complete search history.

(56) References Cited

OTHER PUBLICATIONS

Zhang et al.; Reduction of NO by CO over nanoscale LaCo1—xCuxO3 and LaMn1—xCuxO3 perovskites; Journal of Molecular Catalysis A: Chemical 258 (2006) 22-34.

* cited by examiner

MANGANESE OXIDE-LANTHANUM MANGANATE-PGM COMPOSITES FOR TWC APPLICATIONS

TECHNICAL FIELD

This disclosure is directed to manganese oxide-lanthanum manganate-PGM composites for TWC applications.

BACKGROUND

Internal combustion engines produce exhaust gases containing a variety of pollutants, including hydrocarbons (HCs), carbon monoxide (CO), and nitrogen oxides ("$NO_x$"). Emission control systems or "aftertreatment systems", including exhaust gas catalysts, are widely used to reduce the amount of these pollutants emitted into the atmosphere. A common catalyst for gasoline engine applications is the so-called Three-Way-Catalyst or TWC. TWCs perform three main functions: (1) oxidation of carbon monoxide (CO); (2) oxidation of unburnt hydrocarbons; and (3) reduction of $NO_x$ to $N_2$.

TWCs consisting of Platinum Group Metals (PGMs) dispersed over high surface area alumina and ceria-zirconia supports were first introduced in the early 1980s for gasoline engine aftertreatment. Perovskite-type oxides ($ABO_3$) also have been proposed for use in TWCs. There remains a need to economically meet increasingly stringent emission limits by identifying alternative catalyst compositions which utilize either lower or no PGMs with equivalent or superior catalytic properties.

The current disclosure is directed to addressing some of these issues.

SUMMARY

The present disclosure is directed to composite compositions useful for oxygen storage, and in some cases, these Oxygen Storage Compositions ("OSCs") are at least as effective, and in some cases, more effective than ceria-zirconia (e.g., $Ce_{0.5}Zr_{0.5}O_2$), doped $LaMnO_3$ (e.g., $La_{0.9}Sr_{0.1}MnO_3$), or the individual components of the composites themselves. As used herein, the term "composite" refers to a material made from two or more constituent materials, each with different physical or chemical properties that, when combined, produce a material with characteristics different from the individual components (e.g., better OSC than expected). The individual components remain separate and distinct within the structure, e.g., discernible by XRD, TEM or spectroscopically, but cannot be mechanically separated and thus are distinguishable from chemical mixtures and solid solutions.

The present disclosure is directed to compositions comprising, consisting of, or consisting essentially of $[MnO_x]_y$:$[La_zMnO_3]_{1-y}$, as a composite or otherwise, wherein x is in a range of from about 1 to about 2.5;

y is in a range of from about 1 to about 30 wt %, or from about 1 to about 20 wt %, or from about 2-10 wt % or from about 2 to about 5 wt %; and z is about 0.7 to about 1.1; and the $La_zMnO_3$ is a crystalline perovskite phase.

The disclosed composites can be present as aggregated and/or fused primary particles having a mean surface area in a range of from about 25 to about 60 m$^2$/g, preferably from about 27 to about 45 m$^2$/g and a size in a range of from about 50 nm to about 500 nm. These aggregated and/or fused particles may include separate primary particles of $MnO_x$ and $La_zMnO_3$, each primary particle being independently present in a size range of from about 10 nm to about 60 nm, or any of the ranges described elsewhere herein. The aggregated and/or fused particles comprise separate primary particles of each component, wherein the individual components may be dispersed throughout the agglomerated matrix or may be present so as to provide particle regions rich in $La_zMnO_3$ and/or $MnO_x$. In certain embodiments, the $La_zMnO_3$ primary particles are faceted particles.

In the compositions, the $MnO_x$ may be independently amorphous, crystalline, or mixed phase. The $MnO_x$ may be independently described as predominantly $Mn_3O_4$, $Mn_5O_8$, or a combination thereof.

The crystalline $La_zMnO_3$ in the composition or standing alone, has an A-site occupancy in a range of from about 0.90 to about 1.0, or from about 0.92 to about 0.98. The z in $La_zMnO_3$ may be a value in a range of from about 0.7 to about 1.1, from about 0.8 to about 1.1, from about 0.8 to about 0.99, or from about 0.8 to about 0.95, or any other range described herein. Correspondingly, the compositions may be described as having oxygen vacancies, δ, in a range of from about 0 to about 0.5 or from about 0.01 to about 0.2, such $La_zMnO_3$ compositions may also be represented as $La_zMnO_{3\pm\delta}$. The Mn oxidation state can be 3$^+$.

Additionally or alternatively, oxygen vacancies may further be introduced into the $La_zMnO_3$ structure by further substituting at least a portion of the La with Na, K, Mg, Ca, Sr, Ba, Y, Ce, Pr, or Nd or a combination thereof.

The disclosed composition may further comprise an oxide, hydroxide, and/or carbonate of lanthanum, for example LaOOH and/or $La_2O_2CO_3$.

The disclosed composition or the $La_zMnO_3$ standing alone may further comprise a platinum group metal (PGM) in an amount of about 0.01 wt % to about 0.5 wt %, relative to the weight of the entire composition. The PGM can be Pd. Other options for the PGM include Pt, Rh, Ru, or a combination of two or more PGMs, such as Pd and Pt. For combinations including Pd, the Pd can represent in a molar majority relative to the other PGM components. Alternatively, or additionally, the PGM may be situated predominantly on the surface of the particles.

The disclosed composition may further be prepared or may be defined by a process involving a combustion synthesis method or a co-precipitation method, such as described herein.

The disclosed compositions can be incorporated into a washcoat or washcoat coating.

The disclosed compositions can be incorporated into a vehicular catalytic converter, in which case, the vehicular catalytic converter is also an independent embodiment.

The disclosed compositions can be incorporated into an oxygen storage composition or device and that oxygen storage composition or device can be used in a three-way catalyst.

The disclosed compositions can independently exhibit efficiencies for the conversion of hydrocarbon (HC), CO, and $NO_x$ of at least 65%, 70%, 75%, 80%, 85%, 90%, or 95%, relative to a comparable $Ce_{0.5}Zr_{0.5}O_2$-based composition when operated at a temperature in a range of from about 350° C. to about 550° C.

The present invention also includes methods of treating an exhaust gas from an internal combustion engine, the method comprising contacting the exhaust gas with any one of the compositions described herein, for example in a three-way catalyst, a gasoline or diesel particulate filter, a catalyzed soot filter, a diesel oxidation catalyst.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present application is further understood when read in conjunction with the appended drawings. For illustrating the subject matter, there are shown in the drawings exemplary embodiments of the subject matter; however, the presently disclosed subject matter is not limited to the specific methods, processes, devices, and systems disclosed. In addition, the drawings are not necessarily drawn to scale. In the drawings.

DETAILED DESCRIPTION OF ILLUSTRATIVE EMBODIMENTS

Figure 1:
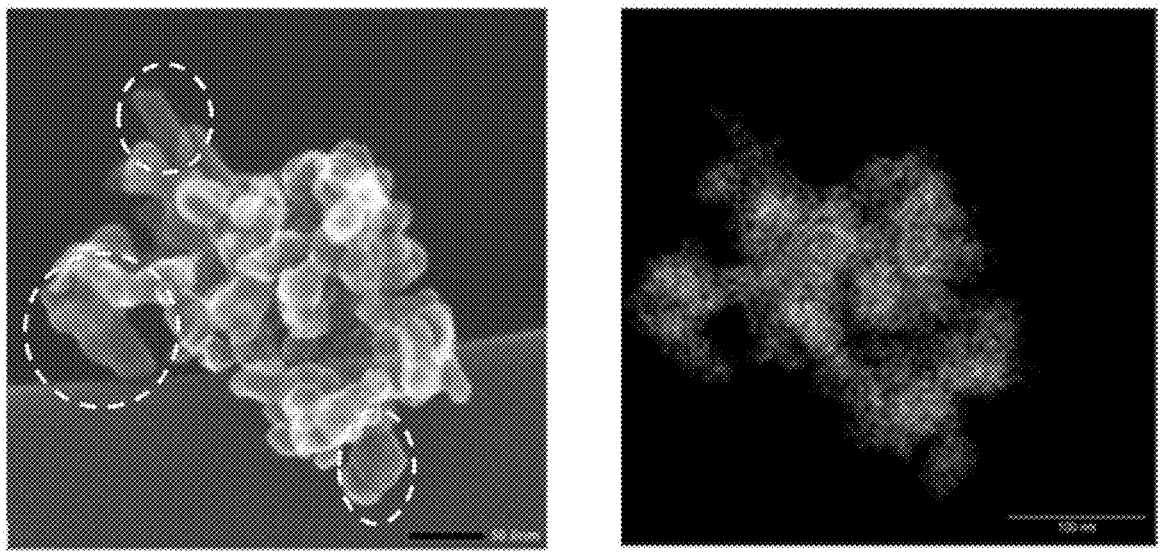
FIG. 1 shows TEM images (bar at 50 nm) and EDX maps (bar at 100 nm) of a first composition characterized as comprising $Mn_3O_4:La_{0.9}MnO_3$. In the EDX map, La and Mn are generally distributed evenly. Some examples of primary particles are highlighted (circled).
Figure 2:
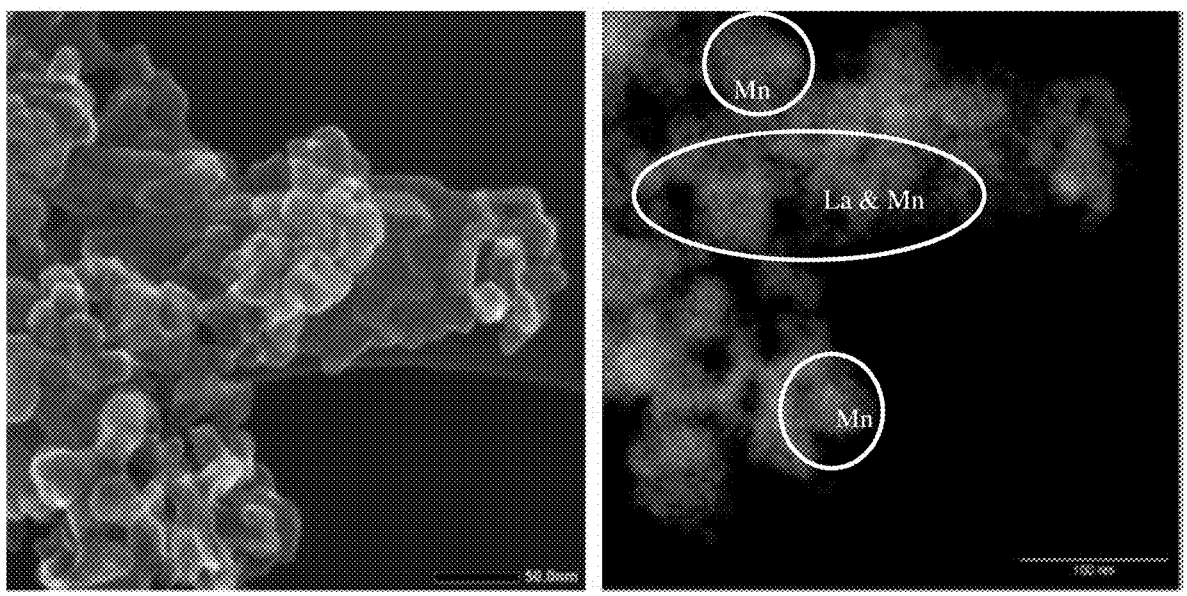
FIG. 2 shows TEM images (bar at 50 nm) and EDX maps (bar at 100 nm) of a second composition characterized as comprising $Mn_3O_4:La_{0.9}MnO_3$. In the EDX map, concentrations of $Mn_3O_4$ and of $La_{0.9}MnO_3$ are circled and identified as "Mn" and "La & Mn", respectively.
Figure 3:
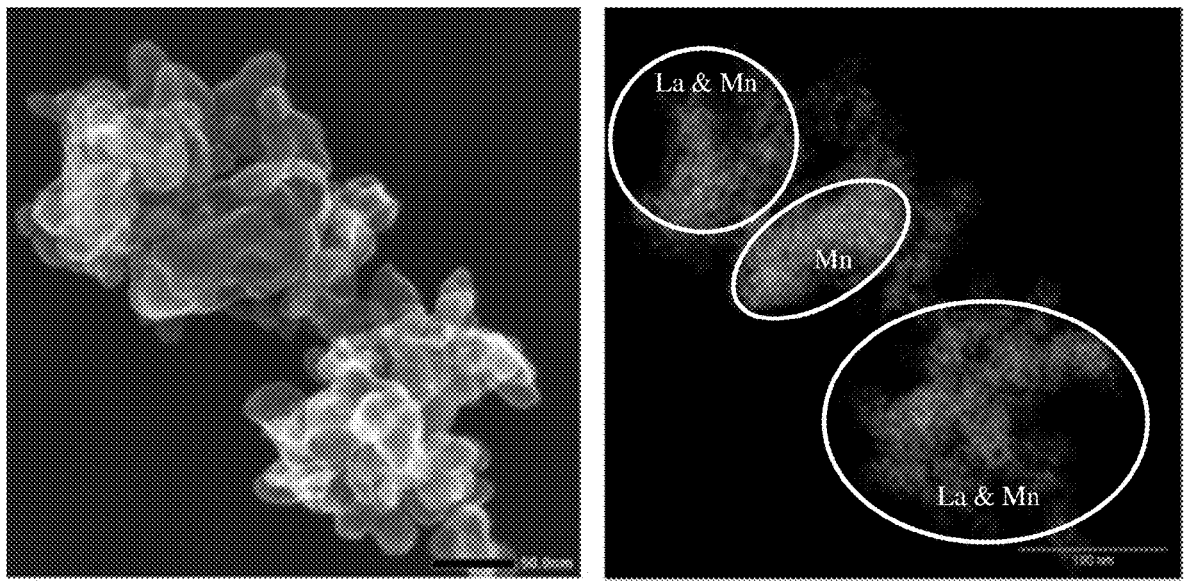
FIG. 3 shows TEM images (bar at 50 nm) and EDX maps (bar at 100 nm) of a third composition characterized as comprising $Mn_3O_4:La_{0.9}MnO_3$. In the EDX map, concentrations of $Mn_3O_4$ and of $La_{0.9}MnO_3$ are circled and identified as "Mn" and "La & Mn", respectively.
Figure 4:
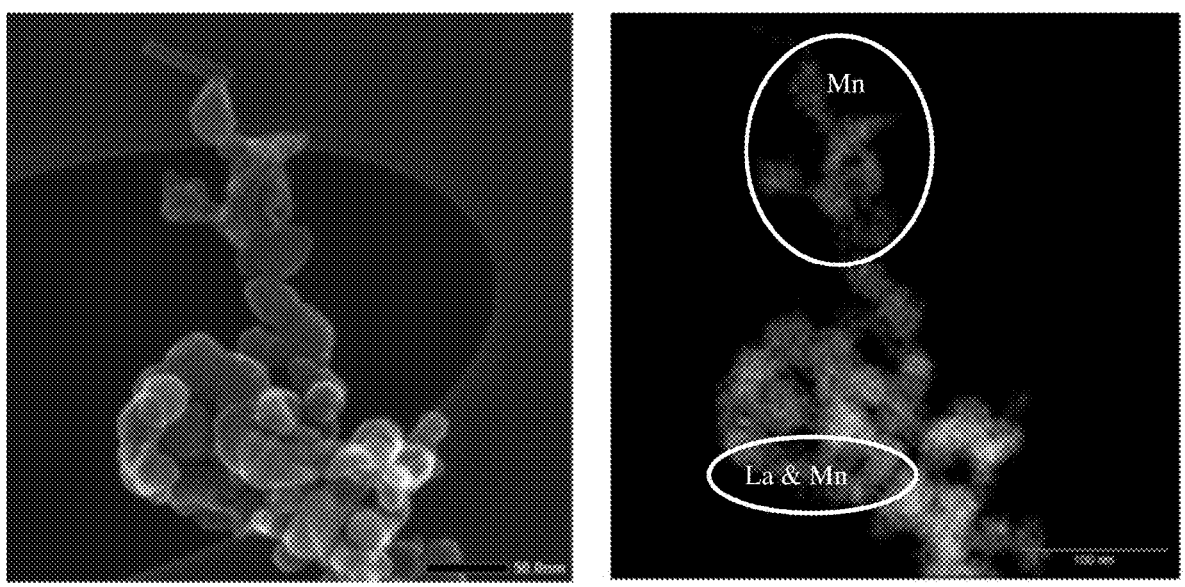
FIG. 4 shows TEM images (bar at 50 nm) and EDX maps (bar at 100 nm) of a fourth composition characterized as comprising $Mn_3O_4:La_{0.9}MnO_3$. In the EDX map, concentrations of $Mn_3O_4$ and of $La_{0.9}MnO_3$ are circled and identified as "Mn" and "La & Mn", respectively.
Figure 5:
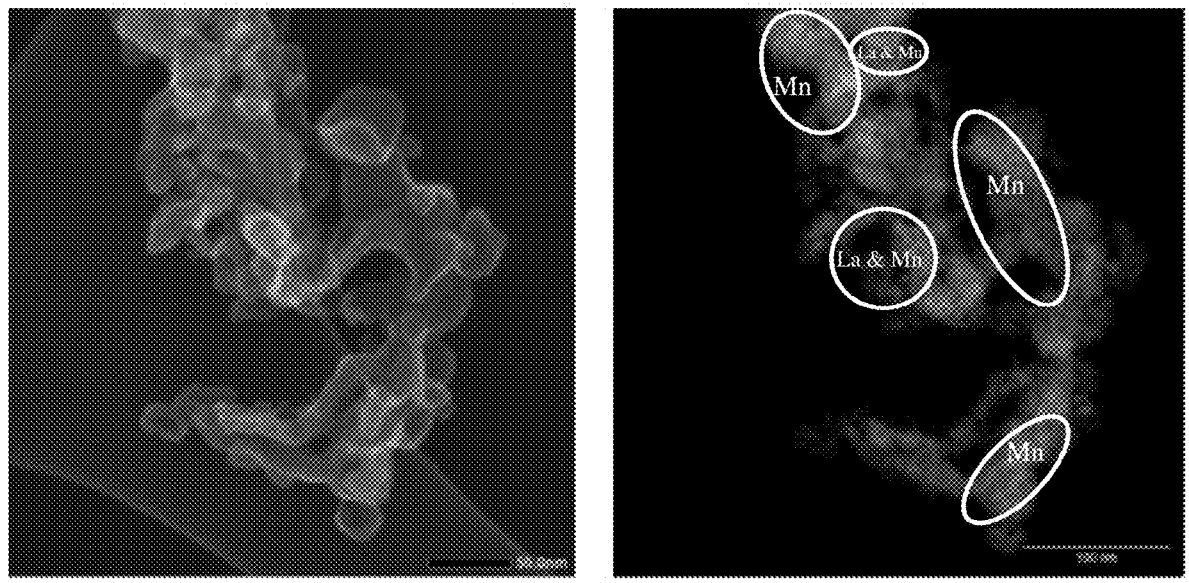
FIG. 5 shows TEM images (bar at 50 nm) and EDX maps (bar at 100 nm) of a composition characterized as comprising $Mn_3O_4:La_{0.9}MnO_3$. In the EDX map, concentrations of $Mn_3O_4$ and of $La_{0.9}MnO_3$ are circled and identified as "Mn" and "La & Mn", respectively.

The present invention may be understood more readily by reference to the following description taken in connection with the accompanying Figures and Examples, all of which form a part of this disclosure. It is to be understood that this invention is not limited to the specific products, methods, processes, conditions or parameters described or shown herein, and that the terminology used herein is for describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this specification, claims, and drawings, it is recognized that the descriptions refer to compositions and processes of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Compositions

The present disclosure includes compositions and methods of making and using these compositions. The compositions can be with or without the presence of platinum group metals (PGMs). In some embodiments, the compositions comprise, consisting of, or consisting essentially of a composition of a formula $[MnO_x]_y:[La_zMnO_3]_{1-y}$; where x is in a range of from about 1 to about 2.5;

y is in a range of from about 1 to about 30 wt %, or from about 1 to about 20 wt %, or from about 2-10 wt % or from about 2 to about 5 wt %; and z is about 0.7 to about 1.1; and the $La_zMnO_3$ is a crystalline perovskite phase.

In independent alternative or additional embodiments, with respect to the cited composition or the $MnO_x$ or $La_zMnO_3$ by themselves, as appropriate:

(a) x can be a value in a range of from about 1 to about 1.1, from about 1.1 to about 1.2, from about 1.2 to about 1.3, from about 1.3 to about 1.4, from about 1.4 to about 1.5, from about 1.5 to about 1.6, from about 1.6 to about 1.7, from about 1.7 to about 1.8, from about 1.8 to about 1.9, from about 1.9 to about 2.0, from about 2.0 to about 2.1, from about 2.1 to about 2.2, from about 2.2 to about 2.3, from about 2.3 to about 2.4, from about 2.4 to about 2.5, or a value defined by a range comprising two or more of these ranges, for example, from about 1.6 to about 2.5. For the avoidance of doubt, the representation "$MnO_x$" refers to any binary oxide of manganese having an O:Mn atomic ratio of x. For example, the designation includes $Mn_3O_4$ (x=1.33), $Mn_5O_8$ (x=1.6), and the like. As such, the value x defines a composition of either discrete formulae for oxides of manganese or mixtures thereof, as described elsewhere herein. In certain independent embodiments, the $MnO_x$ is predominantly $Mn_3O_4$ (x=1.33), $Mn_5O_8$ (x=1.6), or a combination thereof;

(b) y can be a value greater or less than the range in the preceding section. In certain embodiments, y can be a value in a range of from about 0 to about 1 wt % (i.e., considering only the $La_zMnO_3$ by itself), 1 to about 2 wt %, from about 2 to about 3 wt %, from about 3 to about 4 wt %, from about 4 to about 5 wt %, from about 5 to about 6 wt %, from about 6 to about 7 wt %, from about 7 to about 8 wt %, from about 8 to about 9 wt %, from about 9 to about 10 wt %, from about 10 to about 11 wt %, from about 11 to about 12 wt %, from about 12 to about 13 wt %, from about 13 to about 14 wt %, from about 14 to about 15 wt %, from about 15 to about 16 wt %, from about 16 to about 17 wt %, from about 17 to about 18 wt %, from about 18 to about 19 wt %, from about 19 to about 20 wt %, from about 20 to about 21 wt %, from about 21 to about 22 wt %, from about 22 to about 23 wt %, from about 23 to about 24 wt %, from about 24 to about 25 wt %, from about 25 to about 26 wt %, from about 26 to about 27 wt %, from about 27 to about 28 wt %, from about 28 to about 29 wt %, from about 29 to about 30 wt %, or y may be defined by any two or more of these ranges, for examples, from about 2 to about 5 wt %;

(c) z can be a value in a range of from about 0.7 to about 0.75, from about 0.75 to about 0.8, from about 0.8 to about 0.85, from about 0.85 to about 0.9, from about 0.9 to about 0.95, from about 0.95 to about 0.98. from about 0.98 to about 0.99, from about 0.99 to about 1, from about 1 to about 1.05, from about 1.05 to about 1.1, or z may be defined by any two or more of these ranges, for examples, from about 0.75 to about 1.1, or from about 0.8 to about 1, or from about 0.8 to about 0.99, or from about 0.8 to about 0.95.

In alternative or additional independent embodiments the $MnO_x$ in the composition may be amorphous, nano-crystalline, or crystalline, or a mixture of amorphous, nano-crystalline, and crystalline materials. When the $MnO_x$, or any other component, is characterized as amorphous, the composition exhibits no discernible PXRD peaks attributable to an oxide of manganese (but its presence can be determined, for example, by TEM measurements). When the $MnO_x$ is characterized as nano-crystalline, the composition exhibits only broad and poorly shaped PXRD peaks attributable to an oxide of manganese. When the $MnO_x$ is characterized as crystalline, the composition exhibits sharp and well-defined PXRD peaks attributable to an oxide of manganese.

In alternative or additional embodiments, the composites comprise particles having a mean surface area in a range of from about 25 to about 60 $m^2/g$, preferably from about 27 to about 45 $m^2/g$. In independent alternative or additional embodiments, the particles are characterized as having a mean surface area in a range of from about 25 to about 27 $m^2/g$, from about 27 to about 29 $m^2/g$, from about 29 to about 31 $m^2/g$, from about 31 to about 33 $m^2/g$, from about 33 to about 35 $m^2/g$, from about 35 to about 37 $m^2/g$, from about 37 to about 39 $m^2/g$, from about 39 to about 41 $m^2/g$, from about 41 to about 43 $m^2/g$, from about 43 to about 45 $m^2/g$, from about 45 to about 47 $m^2/g$, from about 47 to about 49 $m^2/g$, from about 49 to about 51 $m^2/g$, from about 51 to about 53 $m^2/g$, from about 53 to about 55 $m^2/g$, from about 55 to about 57 $m^2/g$, from about 57 to about 60 $m^2/g$, or the particles may characterized as having a mean surface area spanning two or more of these ranges, for example, from about 27 to about 45 $m^2/g$. These surface areas are most conveniently measured by inert gas (e.g. nitrogen or argon) porosimetry and analyzed using BET equation. The specific values cited herein, can be obtained using $N_2$ at 77 K on a 3Flex surface characterization analyzer (Micromeritics).

The benefit of particles having a surface area of 25 $m^2$ $g^{-1}$ or above is that there are some support sites available to access the oxygen storage function, or to anchor a transition metal or other elemental promoter (e.g. Pt, Pd, or Rh) that can then catalyze the oxygen storage function i.e. improve the rate of oxygen transfer in and out of the structure and therefore lead to enhanced performance, or other catalytic function.

In alternative or additional embodiments, the particles comprise aggregated and/or fused primary particles, the primary particles are separately compositions of $MnO_x$ and of $La_zMnO_3$. The size of the primary particles of each $MnO_x$ and $La_zMnO_3$ may be the same or may be different. In the context of this disclosure, the term "aggregated and/or fused" refers to the fact that the primary particles, comprising individual crystallites, are further joined together in a bonding mode ("fused") to form larger aggregate particles.

In some embodiments, these primary particles are present in a size range of from about 10 nm to about 60 nm, from about 10 nm to about 50 nm, from about 12 nm to about 50 nm, from about 14 nm to about 50 nm, and/or from about 14 nm to about 25 nm. In alternative or additional embodiments, the primary particles are present in a size in a range of from about 10 nm to about 12 nm, from about 12 nm to about 14 nm, from about 14 nm to about 16 nm, from about 16 nm to about 18 nm, from about 18 nm to about 20 nm, from about 20 nm to about 25 nm, from about 25 nm to about 30 nm, from about 30 nm to about 35 nm, from about 35 nm to about 40 nm, from about 40 nm to about 45 nm, from about 45 nm to about 50 nm, from about 50 nm to about 55 nm, from about 55 nm to about 60 nm, or the primary particle sizes may be defined by a range encompassing two or more of these ranges, for example from about 14 nm to about 25 nm. Unless otherwise specified, the definition of primary particles size ranges are determined by TEM measurements, even recognizing the use of use of TEM as a primary measuring approach is subject to errors associated with particle counting statistics.

Particle sizes may also be determined by analyzing the line broadening of reflections in XRD patterns (using Rietveld analysis). This approach measures the unit cell repeat distance in the specific direction of the reflections lattice plane. In the present case, measured sizes tend to be characterized at the lower end of these ranges and have narrower distributions, suggesting that even these primary particles are present as one or more crystallites of the stated compositions. For example, the range of from about 14 to about 25 nm for the primary particle size is consistent with the size of typical crystallite sizes measured by XRD. In one example, primary particles measured as having sizes in a range of from about 10 nm to about 60 nm by TEM were determined from XRD (i.e., average value calculated based on linewidth broadening) to have sizes of about 12-20 nm for $La_{0.9}MnO_3$, about 12-30 nm for $Mn_3O_4$, and about 15 nm for $La_2O_2CO_3$.

The primary particle sizes of the $MnO_x$ and the $La_zMnO_3$, but especially the $La_zMnO_3$, may form the bases of embodiments that are independent of the compositions generally described above; i.e., where the limitation of y is relaxed and can be 0. That is, in independent embodiments, a composition may be described exclusively in terms of primary particles of $La_zMnO_3$ (i.e., exclusive of other Mn— or La-containing materials) having a size in a range of from about 10 to about 60 nm, or any of the permutations or combinations of subranges associated with the primary particle sizes. Consistent with the particle sizes described elsewhere herein, the primary particles may be aggregated into larger structures.

The primary particles of the present disclosure tend to be irregularly shaped as a whole (e.g., see FIGS. 1-5) though the $La_zMnO_3$ does show a tendency to be more spherical and faceted. The $MnO_x$ is generally highly irregular in shape.

Alternatively or additionally, the crystalline $La_zMnO_3$, whether as a component in the composition or by itself, has an A-site occupancy in a range of from about 0.7 to about 0.72, from about 0.72 to about 0.74, from about 0.74 to about 0.76, from about 0.76 to about 0.78, from about 0.78 to about 0.8, from about 0.8 to about 0.82, from about 0.82 to about 0.84, from about 0.84 to about 0.86, from about 0.86 to about 0.88, from about 0.88 to about 0.90, from about 0.90 to about 0.92, from about 0.92 to about 0.94, from about 0.94 to about 0.96, from about 0.96 to about 0.98, from about 0.98 to about 1.0, from about 1.0 to about 1.02, from about 1.02 to about 1.04, from about 1.04 to about 1.06, from about 1.06 to about 1.08, from about 1.08 to about 1.1, or may be defined in terms of two or more of these ranges, for example in a range of from about 0.90 to about 1.0, or from about 0.92 to about 0.98.

In additional embodiments, the disclosed composition further comprises an oxide, hydroxide, and/or carbonate of lanthanum, for example LaOOH and/or $La_2O_2CO_3$. As with the $MnO_x$, the lanthanum components may be amorphous, nano-crystalline, and/or crystalline.

Some of the features of these primary particles may be seen in FIGS. 1-5 (TEM images and EDX maps). For at least the samples presented, it can be seen that generally, (1) the $La_zMnO_3$ primary particles are more faceted; (2) the $MnO_x$ materials have a more amorphous habit; (3) the primary particle size (irregular shape) from TEM is about 10 to about 60 nm; (4) the primary particles are aggregated and/or fused to form regions approximately 50-500 nm, compositionally containing regions enriched in Mn, corresponding $MnO_x$ and regions enriched in La and Mn, corresponding to $La_zMnO_3$; (5) the crystallite size from XRD for $La_zMnO_3$ is about 15-20 nm and for $MnO_x$ is about 15-30 nm, $La_2O_2CO_3$ is about 15 nm (each of these average values can be calculated based on linewidth broadening).

The compositions, or components thereof, may additionally or alternatively comprise a transition metal or transition metal oxide catalyst distributed on a surface of the individual primary particles and/or within the pores of the aggregated or agglomerated primary particles. As described herein, such materials preferably comprise at least one metal and/or oxide thereof (including physical mixtures or alloys) of at least one of Cr, Fe, Ru, Os, Co, Rh, Ir, Ni, Pd, Pt, Cu, Ag, Au, or Zn. Such catalysts may be deposited chemically or by vapor deposition techniques as are known by those skilled in the art.

The compositions, or components thereof, may additionally or alternatively comprise a platinum group metal (PGM). While the term PGM is described elsewhere herein, each of which constitutes an independent embodiment, Pt, Pd, and Rh are especially attractive additives in these compositions. Accordingly, compositions independently comprising Pt, Pd, and Rh are considered independent embodiments. The presence of Pd is preferred for reasons of improving catalytic performance, especially of NO reduction activity, though the use of Rh provides at least equivalent if not superior catalytic conversions over Pd at comparable loadings (e.g., at 0.05 wt % loading).

In additional embodiments, one or more of these PGM are present in an amount in a range of from about 0.005 to about 0.01 wt %, from about 0.01 to about 0.02 wt %, from about 0.02 to about 0.04 wt %, from about 0.04 to about 0.05 wt %, from about 0.05 to about 0.06 wt %, from, about 0.06 to 0.08 wt %, from about 0.08 to about 0.1 wt %, from, about 0.1 to about 0.12 wt %, from about 0.12 to about 0.14 wt %, from about 0.14 to about 0.16 wt %, from about 0.16 to about 0.18 wt %, from about 0.18 to about 0.2 wt %, from about 0.2 to about 0.22 wt %, from about 0.22 to about 0.24 wt %, from about 0.24 to about 0.26 wt %, from about 0.26 to about 0.28 wt %, from about 0.28 to about 0.3 wt %, from about 0.3 to about 0.34 wt %, from, about 0.34 to about 0.38 wt %, from about 0.38 to about 0.42 wt %, from about 0.42 to about 0.46 wt %, from about 0.46 to about 0.5 wt %, from, about 0.5 to about 0.54 wt %, from about 0.54 to about 0.58 wt %, from about 0.58 to about 0.6 wt %, from about 0.6 to about 0.64 wt %, from about 0.64 to about 0.68 wt %, from, about 0.68 to about 0.72 wt %, or from about 0.76 to about 0.8 wt %, relative to the weight of the entire composition, or the amount may be described in terms of two or more of these ranges, for example, from about 0.01 wt % to about 0.5 wt %, or from about 0.1 wt % to about 0.6 wt %. The presence of low levels of PGM, especially Pd, appears to confer an improvement in catalytic activity after aging. Also, having the mix of $MnO_x/La_zMnO_3$ appears to confer additional stability to $MnO_x$, with or without the presence of the PGM. Additionally, by themselves, the perovskites have poor NO reduction activity. PGM metals, and Pd in particular, significantly improves this, even at low loadings. This appears to be due to the competition of NO and other reactants, especially $O_2$, for active sites.

Methods for Making the Compositions and Compositions Derived from the Methods

The disclosure to this point has focused on compositions, but the disclosure also encompasses embodiments directed to making the compositions as described herein. Further, to the extent that compositions prepared by these methods differ/complement the description for the compositions provided elsewhere herein, the products prepared by these methods (e.g., the products-by-process) also represent distinct embodiments.

As described in the Examples elsewhere herein, the inventive compositions may be made by so-called combustion syntheses or precipitation methods. Both methods involve the use of aqueous media for intimate mixing of the precursors, prior to either combustion or precipitation. In the combustion synthesis method, which is more useful for small scale syntheses (e.g., at gram scale syntheses, such as 5-10 gram scale), salts (described elsewhere herein) of the respective metals and stoichiometries are dissolved in an aqueous solvent, to which citric acid (or other combustible gel forming material; e.g., polyols and/or polycarboxy acids) is added (molar ratio of metal:citric acid≈1:1). Subsequent removal of most or all of the solvent, either by heating or vacuum or both results in a gel comprising uniformly distributed the metals. This gel is heated to combustion at a temperature of less than about 300° C. The resulting combusted material is then calcined at a temperature in a range of from about 600° C. to 900° C. (preferably about 650° C. to about 750° C. or about 700° C.) for a time sufficient to give the desired product (typically 2 hours).

In co-precipitation methods, amenable to larger scale reactions (e.g., 5 kg scale or higher), a solution of the corresponding metal salts is transferred into a solution of hydroxide (preferably NaOH or KOH) at an alkaline pH (typically at a pH in a range of from about 9 to about 13). On combination with the hydroxide, the metal salts precipitate to form an oxide/hydroxide suspension, which is then is filtered, washed, dried, and calcined as above.

For either method, the metal precursors can be metal precursors that are at least partially soluble in aqueous solutions, preferably completely soluble as least to levels suitable for the described methods. Typical sources of the Mn or La metals (and other A-site dopants, e.g., Na, K, Mg, Ca, Sr, Ba, Y, Ce, Pr, or Nd) include alkoxides (e.g., $C_{1-6}$ alkoxides), hydroxides, hydrous oxides, hydrogels, fumed or colloidal oxides, or combination thereof. Additionally, any oxidized salt of these metals or elements, such as those comprising beta-diketonates (e.g., acetylacetonates, or "acac"s), alkyl substituted beta-diketonates (e.g., such as 2,2,6,6-tetramethyl 3,5-heptanoates), carbonates, carboxylates (e.g., acetate, propionate, 2-ethylhexanoate, octanoate), halide, hydroxide, nitrate, oxalates, and/or sulfate may serve as appropriate precursors. The use of precursors without halides or sulfur are preferred. Preferred salts include, for example, lanthanum(III) 2-ethylhexanoate (solid or solution), lanthanum(III) acetylacetonate hydrate, lanthanum 2,4-pentanedionate, lanthanum(III) nitrate, manganese(II) 2-ethylhexanoate, manganese(II) acetate, manganese nitrate, or any combination thereof.

Aqueous solvents are preferred, especially when the compositions are prepared at scale, largest of environmental and process safety concerns, though the solvents are not otherwise necessarily limited. Unless otherwise specified, the term "aqueous" solvent refers to a solvent that it at least 95% water, though in other embodiments, the solvent may comprise at least 50%, 60%, 70%, 80%, 90%, or 98% water or may be substantially all water. In addition to the water, aqueous solvents may also comprise carboxylic acids (propionic acid, 2-ethylhexanoic acid, acetic acid) or mono-, di-, or polyhydroxy alcohols.

In individual embodiments, for either method, the calcining temperature comprises at least one temperature in a range of from about 600° C. to about 650° C., from about 650° C. to about 675° C., from about 675° C. to about 700° C., from about 700° C. to about 725° C., from about 725° C. to about 750° C., from about 750° C. to about 800° C., from about 800° C. to about 850° C., from about 850° C. to about 900° C., or a combination of two of these ranges, for example, from about 675° C. to about 725° C. Calcining at a temperature of about 700° C. appears to work well, at least for the materials formed by precipitation of metal nitrate salts. The calcination temperature appears to be an important parameter in the syntheses of these materials. Lower calcination temperatures (less than about 600° C.) result in an amorphous phase that is less active for TWC. Higher calcination temperatures (greater than about 800 or 850° C.) results in collapse of surface area and worse TWC activity.

As shown in the Examples, the co-precipitation yields products containing the compositions as described elsewhere herein, where the $La_zMnO_3$ materials are accompanied by $MnO_x$ and some $La_2O_2CO_3$ or LaOOH. While the $La_zMnO_3$ and $MnO_x$ components of the composition provides catalytic activity to the compositions, it appears that the lanthanum materials do not.

Once formed, the PGM is introduced by any conventional method. The presence of low levels of PGMs, for example Pd, results in the formation of materials which show improved light-off, and increased $NO_x$ reduction activity, relative to the non-PGM compositions. For example, the presence of even 0.01 wt % Pd provides a measurable improvement in the TWC activity and $NO_x$ conversions. Again, the presence of $La_zMnO_x$ provides additional stability to $MnO_x$ particles that have intrinsic TWC activity, but heavily sinter at high temperature. The composite provides unexpected OSC performance relative to either individual component of the composite (see, e.g., Table 1). Also, the OSC for fresh and aged samples of the composites are better than the OSCs of either of the components (i.e., better than the OSCs of $Mn_2O_3:Al_2O_3$ or perovskites, e.g. $La_{0.9}Sr_{0.1}MnO_3$, having similar or lower Mn content, wt %, than the composite.

Applications

The perovskite compositions, both in the presence and absence of the $MnO_x$ and lanthanum materials, show excellent oxygen storage capabilities, making them suitable for a range of applications, including for use in catalytic converters, for use in three-way catalysts (for the conversion of CO, HC, and NO), for use in gasoline and diesel particulate filters and catalyzed soot filters, and for use in diesel oxidation catalysts. Each of these applications are known to those skilled in the art, and so need not be exhaustively listed here. The disclosed compositions may be used in these applications, or in methods of treating exhaust gases from internal combustion reactions, either as part of a washcoat coating or as discrete materials.

Catalytic Converters

Figure 15:
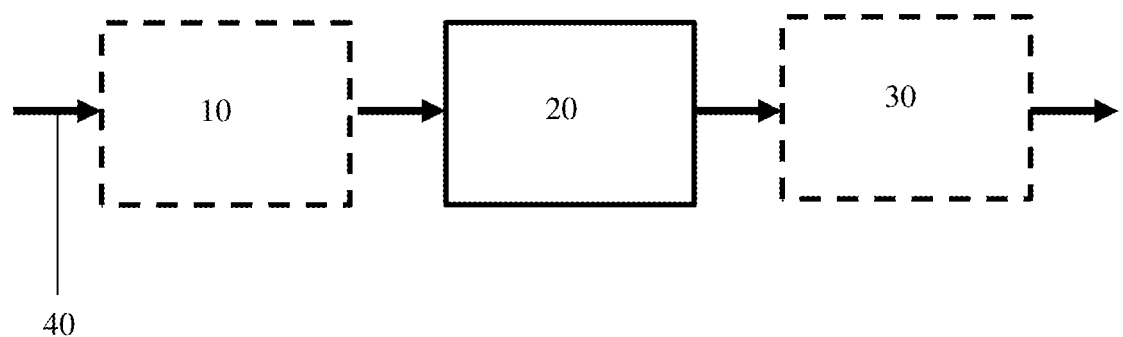
FIG. 15 shows an exhaust system for a gasoline or diesel engine comprising a composition of the present invention.

For example, the present disclosure includes automotive catalytic converters comprising any one or more of the compositions disclosed herein. These compositions may be formulated into a washcoat composition, such washcoat compositions being well-known in the art. In addition to a catalytic component, the washcoat can also contain other components such as binders (e.g., alumina, zirconia, silica, alumina-silica, etc.), rheology agents, and the like. The washcoat can be applied to a substrate, such as a honeycomb flow-through or wall-flow filter as described herein. The coating may be either a coated the length of the substrate, or in zones, such as an upstream zone or downstream zone relative to the orientation of the substrate and gas flow, and/or in layers, such as a top layer, a bottom layer, or a mid-layer relative to the surface of the substrate. Where the coating is arranged as a zone or layer, the alternative zone(s) may be bare, or the alternative zone(s) or layer(s) may be a different catalyst coating with different catalytic properties and/or functionalities. In addition or alternatively to a washcoat, the composition of the present invention can be in the form of an extruded honeycomb monolith. FIG. 15 shows an exhaust system for a gasoline or diesel engine having a first exhaust gas treatment system component 20 comprising a composition of the present invention coated onto a substrate, an optional second exhaust gas treatment system component 10 upstream of the first component 20, and an optional third exhaust gas treatment system component 30 upstream of the first component 20, with respect to the flow of exhaust gas 40 through the system.

These catalytic converters can employ so-called three-way catalysts (TWCs), such as described herein. These are discussed next.

Three Way Catalysts

The present disclosure includes oxygen storage devices comprising a three-way catalyst, each such device or catalyst comprising any one or more of the compositions disclosed herein.

TWC useful in the present invention can have three parts: alumina; an oxygen storage component (OSC); and platinum group metals (PGM) supported on one or both of the alumina and OSC. The alumina component is to provide a rapid light-off of the composition. Light-off is the temperature at which the catalyst is working at 50% or above efficiency for a given reaction. The achievement of rapid light-off is therefore important to treat exhaust gases immediately after cold start. The property of the OSC is explained above. Typically there are at least two PGMs present, one of platinum and palladium as an oxidation catalyst and rhodium as a reduction catalyst. The alumina and OSC are usually intimately mixed and applied to a substrate, such as a ceramic honeycomb, in a washcoat. The PGMs can be impregnated on one or both of the alumina and OSC and either before making up the washcoat, or by adding it to the washcoat. Impregnation of the PGM before making up the washcoat enables the formulator to choose which component is to support a PGM. For example, the rhodium can be supported solely by the OSC and the platinum solely by the alumina. An alternative arrangement is to have the components and/or PGMs in separate layers one above the other.

For reason that are well known in the art, TWCs have been developed to incorporate a component which stores oxygen during leaner periods of the operating cycle, and releases oxygen during richer periods of the operating cycle, thus extending the effective operating window. For such purposes, ceria-based (e.g., ceria-zirconia mixed oxides) materials are used in the majority of current commercial TWCs as oxygen storage components (OSC).

The compositions described herein are well-suited and offer significant advantages over other systems used for this purpose. The PGM on the perovskite-based composite provide improvement in light-off temperature for the CO and HC oxidation and unexpected improvement in the $NO_x$ light-off and conversion compared to base metal analogues and to other materials that do not contain this feature, or at a cost enjoyed by the disclosed materials. For example, the oxygen storage capability ("OSC") of $MnO_x$—$La_zMnO_3$ is larger than that measured for $Ce_{0.5}Zr_{0.5}O_2$, and under the operating conditions of a TWC the PGM/$MnO_x$—$La_zMnO_3$ has comparable OSC to the PGM/CeZr-based systems. See Examples. In comparison to standard TWC formulations that contain PGM at much higher loadings, formulations containing PGM/$MnO_x$—$La_zMnO_3$, at the PGM loadings reported here 0.01 to 0.4 wt %, are much cheaper.

Accordingly, one aspect of the present disclosure is directed to a catalyst article for treating exhaust gas comprising at least the crystalline compositions disclosed herein. Such catalyst article may also comprise: a substrate; and a catalytic region on the substrate; wherein the catalytic region comprises a first platinum group metal (PGM) component and a composition comprising any one of the crystalline perovskites described herein, functioning as an oxygen storage component (OSC) material. This catalyst article may also comprise an inorganic oxide support. Additional embodiments also encompass exhaust systems for internal combustion engines such a system. Still further embodiments include treating an exhaust gas from an internal combustion engine, in particular for treating exhaust gas from a gasoline engine. In some embodiments, the methods comprise contacting the exhaust gas with the three-way catalyst component of the invention.

Within the context of this use, the first PGM is preferably palladium, platinum, rhodium, and mixtures thereof. More preferably, the first PGM is palladium. The catalytic region may further comprise a second PGM component that may be palladium, platinum, rhodium, and a mixture thereof. Particularly preferably, the second PGM component is rhodium if the first PGM component is palladium. The first and second PGM components can be present in a ratio of about 1:1, about 1.1:1 to about 10:1, for example about 1.5:1, about 2:1, about 3:1, about 4:1, or about 5:1. For such ratios, the first PGM is preferably Pd. For such ratios, the second PGM is preferably Rh. The catalytic region can be essentially free of PGM metals other than the palladium component.

Further, the TWC composition may comprise any one of the compositions disclosed herein and at least one optionally doped form of alumina wherein the at least one form of alumina (e.g., alpha, beta, gamma, delta, or theta alumina) is doped with at least one of a rare earth metal, silicon, germanium, phosphorus, arsenic, calcium, strontium or barium. Such compositions may be in the form of a washcoat or washcoat coating. Such compositions may also be considered analogs of the catalysts described in U.S. Pat. No. 7,396,516, which is incorporated by reference herein in its entirety, or at least for its teaching of the compositions and forms of the optionally doped alumina and for their methods of making to TWC compositions.

Preferably the substrate is a flow-through monolith or a filter monolith. Suitable materials for forming the monolith substrate include ceramic-like materials such as cordierite, silicon carbide, silicon nitride, zirconia, mullite, spodumene, alumina-silica magnesia, aluminum titanate, or zirconium silicate, or of porous, refractory metal. Such materials and their use in the manufacture of porous monolith substrates is well known in the art.

These three-way catalysts may also be characterized in terms of their performance, as well as their compositions, when the performance is compared against a standard. For example, in certain embodiments, the present compositions may be described also in terms of their ability to perform against a ceria-zirconia standard; for example, where the composition exhibits independently exhibits efficiencies for the conversion of hydrocarbon (HC), CO, and $NO_x$ of at least 65%, 70%, 75%, 80%, 85%, 90%, or 95%, relative to a comparable $Ce_{0.5}Zr_{0.5}O_2$-based composition when operated at a temperature in a range of from about 350° C. to about 550° C. The comparisons of these efficiencies "relative to a comparable $Ce_{0.5}Zr_{0.5}O_2$-based composition" refers to an activity of a corresponding (e.g., with comparable dopants and PGM content) $Ce_{0.5}Zr_{0.5}O_2$-based composition, these latter compositions being considered the benchmark of performance. For example, if under a given set of conditions, the $Ce_{0.5}Zr_{0.5}O_2$-based composition converts 60% of the available $NO_x$, then a disclosed composition exhibiting an efficiency of at least 85% would convert at least 60%× 85%, or at least 51% of the available $NO_x$ under the same operating conditions.

Another aspect of the present disclosure is directed to a method for treating a vehicular exhaust gas containing $NO_x$, CO, and HC using the catalyst article described herein. Catalytic converters equipped with TWC made using these materials show at least comparable, if not improved, catalytic performance compared to conventional TWC Such a system can also comprise a second catalyst article provided upstream of the disclosed articles, such that the PGM/MnO$_x$:La$_2$MnO$_3$ catalyst article can comprise a gasoline particulate filter (GPF) or a TWC. The second catalytic article can be an OSC, NO$_x$ Trap, Hydrocarbon Trap, or bar or catalyzed filter. More preferably, the second catalyst article is placed downstream of the first catalyst article.

Gasoline and Diesel Particulate Filters, Catalyzed Soot Filters, and Hydrocarbon Traps The compositions disclosed herein can be applied to particulate filters to form a catalyzed particulate filter, which is also within the scope of this invention. Internal combustion engines are also known to generate particulate matter by incomplete combustion of the fuels used therein, as are particulate traps for trapping such particulate matter in the exhaust gas in an exhaust passage. The purpose of these traps or filters, in the context of exhaust purification systems for gasoline or diesel engines, is to suppress the amount of particulate matter which is released into the atmosphere. Such filter systems often include structures comprising mixed oxides such as alumina, silica-titania, titania-zirconia, silica-zirconia, silica-gallium oxide, titania-alumina, silica-yttrium oxide, alumina-zirconia, silica-lanthanum oxide, titania-cadmium oxide, titania-stannous oxide, titania-zinc oxide, zinc oxide-silica, and zinc oxide-cadmium oxide. As such, the present compositions and mixed oxide systems are particularly suitable for this application and filters comprising the compositions described herein. When used in the context of the three-way catalyst (TWC) systems discussed above, the catalyzed particulate filter may include the TWC or be located either upstream or downstream of the three-way catalyst, with respect to the flow of exhaust gas through the system.

Suitable molecular sieves can be used in the present invention, for example to adsorb unburned hydrocarbons following cold-start of an automobile engine and desorbing adsorbed hydrocarbons at above ambient temperature, e.g. when an associated precious metal-based oxidation catalyst component has reached a desired light-off temperature for e.g. CO and HC oxidation or NO$_x$ reduction. These molecular sieves can be included on the same substrate as the OSC or on a separate substrate either upstream or downstream of the OSC. Such molecular sieves are generally not those having an 8-ring pore opening structure as its largest pore opening structure, sometimes called "small pore" molecular sieves. Preferred molecular sieves are medium pore (maximum 10-ring pore opening structure), large pore (maximum 12-ring pore opening structure) or oven meso pore (>12-ring pore opening structure) molecular sieves. The or each zeolitic molecular sieve or the or each non-zeolitic molecular sieve (e.g., silica-alumino-phosphate or SAPO) can be selected from the framework type code ABW, AEL, AET, AFG, AFI, AFO, AFR, AFS, AFY, AHT, AST, ASV, ATN, ATO, ATS, ATV, AWO, AWW, BCT, BEA, BEC, BIK, BOF, BOG, BPH, BRE, BSV, CAN, CAS, CFI, CGF, CGS, -CHI, -CLO, CON, CZP, DAC, DFO, DOH, DON, EMT, EON, ESV, ETR, EUO, EZT, FAR, FAU, FER, FRA, GIU, GME, GON, HEU, IFR, IMF, ISV, ITH, ITR, IWR, IWS, IWV, IWW, JBW, JRY, LAU, LIO, -LIT, LOS, LOV, LTF, LTL, LTN, MAR, MAZ, MEI, MEL, MEP, MFI, MFS, MOR, MOZ, MRE, MSE, MSO, MTF, MTN, MTT, MTW, MWW, NAB, NAT, NES, NON, NPO, OBW, OFF, OSI, OSO, -PAR, PON, -RON, RRO, RSN, RTE, RUT, RWR, RWY, SAO, SAS, SBE, SBS, SBT, SFE, SFF, SFG, SFH, SFN, SFO, SFS, SGT, SOD, SOF, SOS, SSF, SSY, STF, STI, STO, STT, STW, -SVR, SZR, TER, TOL, TON, TUN, UOS, UOZ, USI, UTL, VET, VFI, VSV, WEI or -WEN (as defined by the Structure Commission of the International Zeolite Association) or is a mixture of any two or more thereof. Preferred zeolitic and non-zeolitic molecular sieves are selected from the group consisting of BEA, FAU, FER, MFI, MFS, MOR, STI, SZR and mixtures of any two or more thereof. Particularly preferred zeolitic or non-zeolitic molecular sieves are selected from the group consisting of BEA, FER, MFI, STI and mixtures of any two or more thereof. Particularly preferred zeolitic molecular sieves are ZSM-5, beta, ferrierite and mixtures of any two or more thereof. Prefer synthetic aluminosilicate zeolitic molecular sieve having a silica-to-alumina ratio of 10 or greater, for example 15 to 150, 20 to 60 or 25 to 40 for improved thermal stability. The molecular sieve can be free of transition metal, such as copper, iron, and the like. Alternatively, the molecular sieve can include an exchanged metal, such as copper or iron, to improve catalytic activity or thermo durability.

Diesel Oxidation Catalysts

Certain embodiments of the present disclosure include diesel oxidation catalysts comprising any one or more of the compositions disclosed herein. Both diesel and gasoline engines produce to different degrees exhaust emissions that generally contains at least four classes of pollutant that are legislated against by inter-governmental organizations throughout the world: carbon monoxide (CO), unburned hydrocarbons (HCs), oxides of nitrogen (NO$_x$) and particulate matter (PM). Emissions standards for both type of engines, whether stationary or mobile (e.g. vehicular engines), are being progressively tightened. There is a need to provide improved catalysts and exhaust systems that meet these standards, which are cost-effective.

Oxidation catalysts, such as diesel oxidation catalysts (DOCs), typically oxidize carbon monoxide (CO) and hydrocarbons (HCs) in an exhaust gas produced by a diesel engine. Diesel oxidation catalysts can also oxidize some of the nitric oxide (NO) that is present in the exhaust gas to nitrogen dioxide (NO$_2$). Even though nitrogen dioxide (NO$_2$) is itself a pollutant, the conversion of NO into NO$_2$ can be beneficial. The NO$_2$ that is produced can be used to regenerate particulate matter (PM) that has been trapped by, for example, a downstream diesel particulate filter (DPF) or a downstream catalyzed soot filter (CSF). Generally, the NO$_2$ generated by the oxidation catalyst increases the ratio of NO$_2$:NO in the exhaust gas from the outlet of the oxidation catalyst compared to the exhaust gas at the inlet. This increased ratio can be advantageous for exhaust systems comprising a downstream selective catalytic reduction (SCR) catalyst or a selective catalytic reduction filter (SCRF™) catalyst. The ratio of NO$_2$:NO in the exhaust gas produced directly by a diesel engine may be too low for optimum SCR or SCRF catalyst performance.

At least in this context, embodiments include those oxidation catalysts comprising one or more transition metal catalysts, preferably a platinum group catalyst. In some embodiments, the catalytic metal independently includes any one or more of palladium (Pd), platinum (Pt), rhodium (Rh), gold (Au), silver (Ag), iridium (Ir), ruthenium (Ru) and mixtures of two or more thereof.

Terms

In the present disclosure the singular forms "a," "an," and "the" include the plural reference, and reference to any particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method or process steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) of a composition is its ability to function as a TWC catalyst; i.e., the composition has no additional material capable of effecting the transformations associated with such a catalyst at rates or efficiencies comparable to the claimed compositions.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C." As a further example, a listing of "Pt, Pd, and/or Rh" includes the independent embodiments "Pt," "Pd," "Rh," "Pt and/or Pd," "Pt and/or Rh," "Pd and/or Rh," as well as "Pt, Pd, and/or Rh." Likewise, use of the symbols "≤" and "≥" refers to ranges in which the endpoint values are included in the range. But subsets of these ranges may also include those where one or both endpoint values are excluded. For example, an embodiment such as "0.15≤x≤0.5" refers to the range where the range is defined to include the endpoints 0.15 and 0.5. Separate independent embodiments include those where the range may be defined as "0.15<x≤0.5" or "0.15≤x<0.5" or "0.15<x<0.5."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Throughout this specification, words are to be afforded their normal meaning, as would be understood by those skilled in the relevant art. However, to avoid misunderstanding, the meanings of certain terms will be specifically defined or clarified.

Unless otherwise indicated, the term "isolated" means physically separated from the other components so as to be free of solvents or other impurities; additional embodiments include those where the compound is substantially the only solute in a solvent or solvent fraction, such as analytically separated in a liquid or gas chromatography phase.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

"Optional" or "optionally" means that the subsequently described circumstance may or may not occur, so that the description includes embodiments where the circumstance occurs and instances where it does not.

The acronym "PGM" as used herein refers to "platinum group metal". The term "platinum group metal" generally refers to Ru, Rh, Pd, Os, Ir, or Pt, preferably Ru, Rh, Pd, Ir, or Pt. The term "PGM" preferably refers to at least one of Rh, Pt, and/or Pd.

The terms "separating" or "separated" carries their ordinary meaning as would be understood by the skilled artisan, insofar as it connotes separating or isolating the product material from other starting materials or co-products or side-products (impurities) associated with the reaction conditions yielding the material. As such, it infers that the skilled artisan at least recognizes the existence of the product and takes specific action to separate or isolate it. Absolute purity is not required, though preferred, as the material may contain minor amounts of impurities and the separated or isolated material may contain residual solvent or be dissolved within a solvent used in the reaction or subsequent purification of the material.

As used herein, the term "substantially free of" as used herein with reference to a material, typically in the context of a composition, means that the material in a minor amount, such as ≤5% by weight, preferably ≤2% by weight, more preferably ≤1% by weight. The expression "substantially free of" embraces the expression "does not comprise." The expression "essentially free of" as used herein means that the material in an even lesser, trace amount, such as ≤1% by weight, preferably ≤about 0.5% by weight, more preferably ≤about 0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The following listing of specific Embodiments is intended to complement, rather than displace or supersede, the previous descriptions.

Embodiment 1

A composition comprising a composite of aggregated and/or fused primary particles, the aggregated and/or fused primary particles collectively comprising, consisting of, or consisting essentially of a composition $[MnO_x]_y$:$[La_zMnO_3]_{1-y}$;
wherein
x is in a range of from about 1 to about 2.5;
y is in a range of from about 1 to about 30 wt %, or from about 1 to about 20 wt %, or from about 2-10 wt % or from about 2 to about 5 wt %; and
z is about 0.7 to about 1.1; and
the $La_zMnO_3$ is a crystalline perovskite phase.
In some Aspects of this Embodiment, the aggregated and/or fused primary particles of the composite have a mean surface area in a range of from about 25 to about 60 m²/g, preferably from about 27 to about 45 m²/g.

Embodiment 2

The composition of Embodiment 1, wherein the $MnO_x$ is amorphous.

Embodiment 3

The composition of Embodiment 1, wherein the $MnO_x$ is crystalline. That is, the primary particles of $MnO_x$ are crystalline. Conversely, in other Aspects, the primary particles of $MnO_x$ are nanocrystalline or amorphous (i.e., not seen in PXRD).

Embodiment 4

The composition of any one of Embodiments 1 to 3, wherein the primary particles individually comprise particles and/or crystallites of $MnO_x$ and of $La_zMnO_3$.

Embodiment 5

The composition of Embodiment 4, wherein the composition comprises primary particles of $MnO_x$ are present in a size range of from about 10 nm to about 60 nm, preferably from about 12 nm to about 50 nm and/or the primary particles of $La_zMnO_3$ are present in a size of from about 10 nm to about 60 nm, preferably from about 12 nm to about 25 nm. Other size ranges are described elsewhere herein. Also, in certain Aspects of this Embodiment, the individual primary particles may also represent individual sub-embodiments, as in "a composition comprising primary particles of $La_zMnO_3$ (i.e., without extraneous Mn or La materials), having a size in a range of from about 10 to about 60 nm, preferably from about 12 nm to about 25 nm, or from about 14 nm to about 25 nm." In other Aspects of this Embodiment, described elsewhere herein, the primary particles are present or may be characterized as aggregates.

Embodiment 6

The composition of any one of Embodiments 1 to 5, wherein the $MnO_x$ is predominantly $Mn_3O_4$, $Mn_5O_8$, or a combination thereof.

Embodiment 7

The composition of any one of Embodiments 1 to about 6, wherein the crystalline $La_zMnO_3$ has an A-site occupancy in a range of from about 0.90 to about 1.1, or from about 0.92 to about 0.98.

Embodiment 8

The composition of any one of Embodiments 1 to 7, wherein z is a value in a range of from about 0.7 to about 1.1, from about 0.8 to about 1.1, from about 0.8 to about 0.99, or from about 0.8 to about 0.95.

Embodiment 9

The composition of any one of Embodiments 1 to 8, further comprising an oxide, hydroxide, and/or carbonate of lanthanum, for example LaOOH and/or $La_2O_2CO_3$.

Embodiment 10

The composition of any one of Embodiments 1 to 9, further comprising a platinum group metal (PGM) in an amount of about 0.01 wt % to about 0.5 wt %, relative to the weight of the entire composition, preferably where the PGM is Pd or Rh, and/or the PGM is situated predominantly on the surface of the primary particles.

Embodiment 11

The composition of any one of Embodiments 1 to 10, prepared by any of the methods described herein, for example:
(a) precipitating a lanthanum-manganese hydroxide precursor from an aqueous solution comprising lanthanum and manganese, the lanthanum and manganese each independently being a salt comprising acetylacetonate, carboxylate, carbonate, halides, nitrate, and/or oxalate (for example $La(NO_3)_3$ and $Mn(NO_3)_2$), using an alkali metal hydroxide, thereby providing an aqueous suspension having a pH in a range of from about 9 to about 13; then
(b) calcining the lanthanum-manganese hydroxide at a temperature in a range of from about 600° C. to about 1100° C.; and then optionally
(c) depositing the PGM onto the composition primary or aggregated particles.

Embodiment 12

An automotive catalytic converter comprising a washcoat, the washcoat comprising a composition of any one of Embodiments 1 to 11.

Embodiment 13

An oxygen storage device comprising a three-way catalyst comprising the composition of any one of Embodiments 1 to 11.

Embodiment 14

A three-way catalyst comprising a composition of any one of Embodiments 1 to 11, wherein the composition independently exhibits efficiencies for the conversion of hydrocarbon (HC), CO, and $NO_x$ of at least 65%, 70%, 75%, 80%, 85%, 90%, or 95% relative to a comparable $Ce_{0.5}Zr_{0.5}O_2$-based composition when operated at a temperature in a range of from about 350° C. to about 550° C.

Embodiment 15

A gasoline or diesel particulate filter or a catalyzed soot filter comprising the composition of any one of Embodiments 1 to 11. In certain Aspects of this Embodiment, the gasoline or diesel particulate filter or a catalyzed soot filter is a washcoated gasoline or diesel particulate filter or a catalyzed soot filter.

Embodiment 16

A diesel oxidation catalyst comprising the composition of any one of Embodiments 1 to 11.

Embodiment 17

A method of treating an exhaust gas from an internal combustion engine, the method comprising contacting the exhaust gas with a catalytic converter of Embodiment 13, with a three-way catalyst of Embodiment 14, with a gasoline or diesel particulate filter or a catalyzed soot filter of Embodiment 15, or with a diesel oxidation catalyst of Embodiment 17.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein. In certain embodiments, the methods and characterizations described in the following paragraphs may also be read in the context of the more general descriptions.

In the following examples, efforts have been made to ensure accuracy with respect to numbers used (e.g. amounts, temperature, etc.) but some experimental error and deviation should be accounted for. Unless indicated otherwise, temperature is in degrees Celsius, and pressure is at or near atmospheric.

The materials produced in the examples described below and elsewhere herein were characterized or are characterized by one or more of the following analytic methods. Powder X-ray diffraction (PXRD) patterns were collected on a Bruker D8 powder diffractometer using a CuKα radiation (40-45 kV, 40 mA) at a step size of 0.04° and a 1 s per step between 5° and 100° (2θ). Transmission electron microscopy (TEM) images were obtained on a JEM 2800 (Scanning) TEM with 200 kV Voltage. The micropore volume and surface area were measured using $N_2$ at 77 K on a 3Flex surface characterization analyzer (Micromeritics).

Example 1. Composite 1 with $MnO_x:La_{0.9}MnO_3$ (La:Mn about 0.9:1)

Example 1.1

Figure 7:
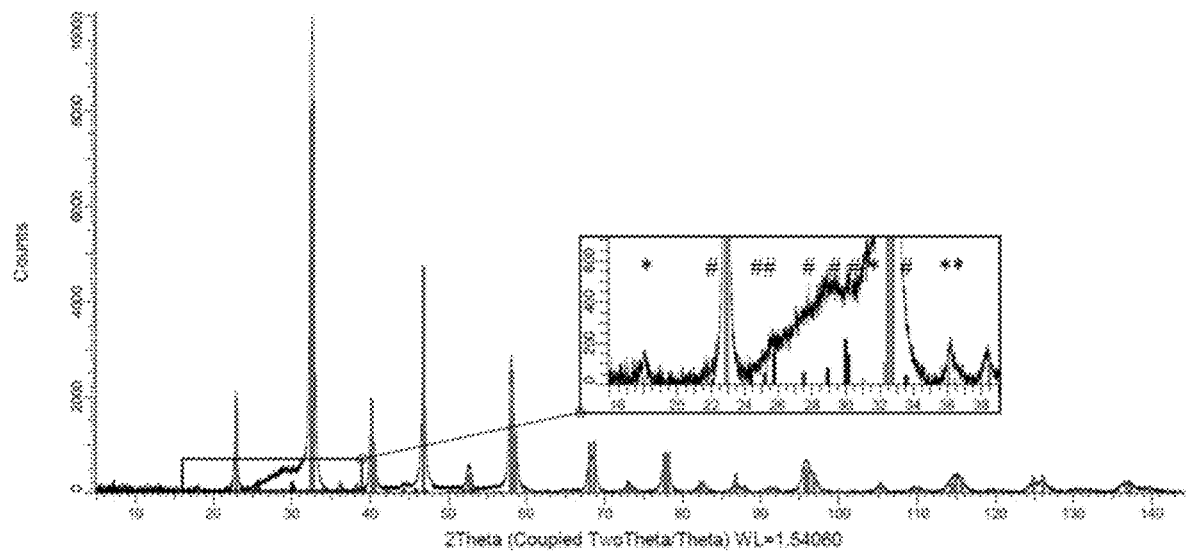
FIG. 7 shows a PXRD pattern of one exemplary embodiment of the present disclosure, prepared by a co-precipitation method. Unmarked bars are associated with $La_{0.9}MnO_3$. Bars marked by * are associated with $Mn_3O_4$, synthetic Hausmannite. Bars marked by # are associated with LaOOH lanthanum oxide hydroxide.

Co-precipitation: KOH (85%, 9.40 g, 0.1425 mol) was dissolved in water (200 ml) and the solution was stirred at 400 rpm using a magnetic stirrer bar and heated to 60° C. Lanthanum nitrate hexahydrate (9.74 g, 0.0225 mol) and manganese nitrate (50 wt/w % solution, 8.95 g, 0.025 mol) were dissolved in water to give 100 ml total volume of solution. The salt solution was added to the base at 10 ml/min. When the addition was complete the precipitate was aged with stirring for 30 mins at 60° C. The material was collected by filtration, washed to remove adsorbed ions and dried at 105° C. The sample was fired at 700° C. for 2 h in air to form perovskite phase. BET 30 $m^2$/g. Perovskite crystallite size 13 nm, 98% perovskite phase. A representative XRD is shown in FIG. 7.

Example 1.2

Figure 8:
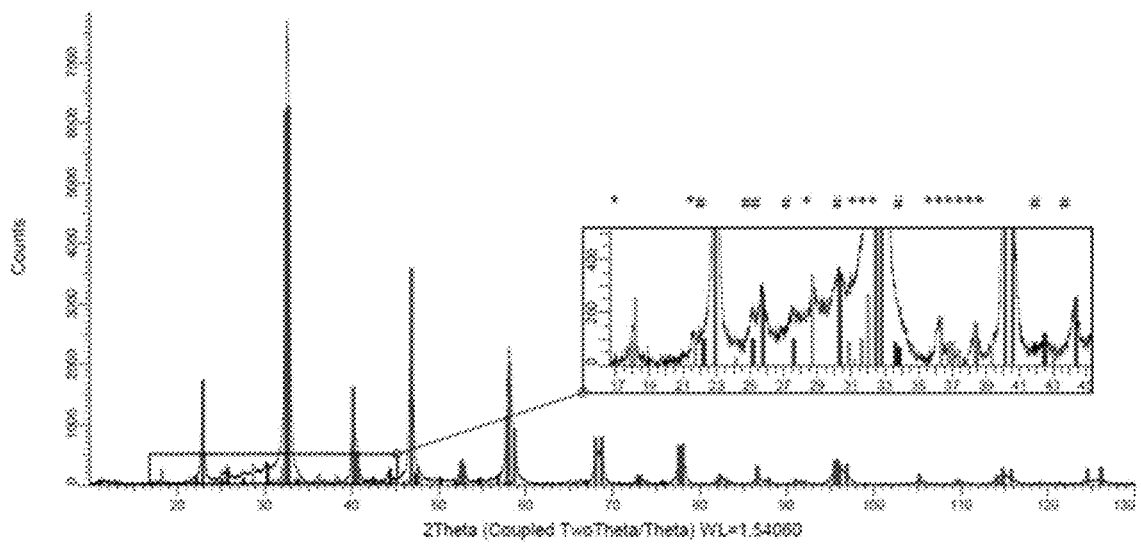
FIG. 8 shows a PXRD pattern of a second exemplary embodiment of the present disclosure, prepared by a co-precipitation method. Unmarked bars are associated with $La_{0.937}MnO_3$. Bars marked by * are associated with $Mn_5O_8$, manganese oxide. Bars marked by # are associated with $La_2O_2CO_3$ lanthanum oxide carbonate.

Co-precipitation: KOH (85%, 900 g, 13.6 mol) was dissolved in water (7 L) and the solution was stirred and heated to 60° C. Lanthanum nitrate hexahydrate (897 g, 2.07 mol) and manganese nitrate (50 wt/w % solution, 927 g, 2.59 mol) were dissolved in water to give 1.5 L total volume of solution. The salt solution was added to the base at 10 ml/min. When the addition was complete the precipitate was aged with stirring for 30 mins at 60° C. The material was collected by filtration, washed to remove adsorbed ions and dried at 105° C. The sample was fired at 700° C. for 2 h in air to form perovskite phase. BET 31 $m^2$/g. Perovskite crystallite size 15.6 nm, 77.7% perovskite phase. A representative XRD is shown in FIG. 8.

Example 1.3

Co-precipitation: NaOH (1000 g, 25 mol) was dissolved in water (5.5 L). The solution was stirred and heated to 60° C. Lanthanum nitrate hexahydrate (2062 g, 4.68 mol) was dissolved in 50 wt % manganese nitrate solution (1861 g, 5.2 mol) and water to give 2.7 L salt feed solution. The salt solution was added at 40 ml/min to the stirred NaOH solution. When the addition was complete the precipitate slurry was stirred for a further 30 mins. The material was collected by filtration and washed with water to remove adsorbed ions. The sample was dried at 105° C. and fired at 700° C. in air for 2 h to form perovskite phase. Perovskite crystallite size 16.7 nm, 92.7% perovskite phase. BET 31 $m^2$/g.

Example 2. Composite 2 with $MnO_x:La_{0.9}MnO_3$ (La:Mn about 0.8:1)

Example 2.1

Combustion: as published by Baythoun et al. [M. S. G. Baythoun, F. R. Sale, J. Mater. Sci., 17, 1982, 2757].

Figure 6:
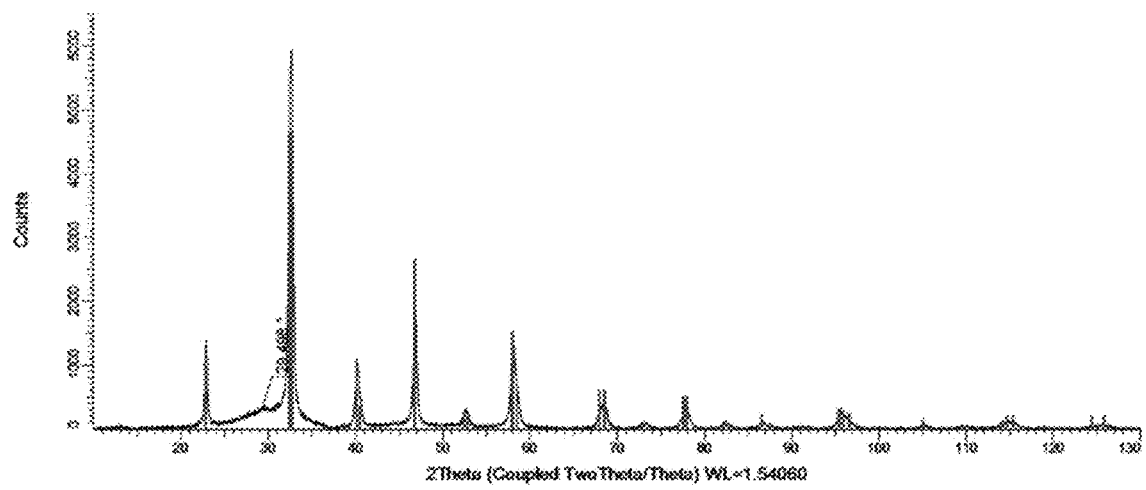
FIG. 6 shows a PXRD pattern of a material prepared by a combustion synthesis, Trace shows pattern as measured. Bars are peaks associated with $La_{0.894}MnO_3$.

Lanthanum nitrate hexahydrate (8.28 g, 0.022 mol) and manganese nitrate tetrahydrate (6.183 g, 0.024 mol) was dissolved in minimum amount of water. Citric acid (9.038 g, 0.043 mol) solution in water (metal:citric acid 1:1) was added dropwise to this solution, then the water was evaporated on a hot plate. The resulting gel was combusted in a calcination oven below 300° C. and fired at 700° C. for 2 h in air. BET 45 m$^2$/g. Perovskite crystallite size 13 nm, 100% perovskite phase. XRD is shown in FIG. 6. XPS shows Mn enrichment at the surface: La:Mn ratio measured: 0.7; La:Mn ratio calculated: 0.9.

Example 2.2

Co-precipitation: KOH (85%, 9 Kg, 136.34 mol) was dissolved in water (35 L) and heated to 60° C. with stirring. Lanthanum nitrate hexahydrate (8.97 Kg, 20.71 mol) was dissolved in manganese nitrate solution 50 wt % (9.27 Kg, 25.9 mol) and hot water to give 14 L solution. The salt mixture was pumped into the KOH solution at 333 ml/min. The precipitate slurry was stirred at 60° C. for 30 mins and then filtered. The material was washed, dried at 105° C. and fired at 700° C. for 2 h in air. Perovskite crystallite size 17 nm.

Example 3. Composite 3 with $MnO_x$:$La_{0.9}MnO_3$ (La:Mn about 0.7:1)

Example 3.1

Co-precipitation: KOH (85%, 8.41 g, 0.127 mol) was dissolved in water (200 mL) and the solution was stirred at 400 rpm using a magnetic stirrer bar and heated to 60° C. Lanthanum nitrate hexahydrate (7.58 g, 0.0175 mol) and manganese nitrate (50 wt/w % solution, 8.95 g, 0.025 mol) were dissolved in water to give 100 mL total volume of solution. The salt solution was added to the base at 10 mL/min. When the addition was complete the precipitate was aged with stirring for 30 mins at 60° C. The material was collected by filtration, washed to remove adsorbed ions and dried at 105° C. The sample was fired at 700° C. for 2 h in air to form perovskite phase. Perovskite crystallite size 12.5 nm, 90.9% perovskite phase.

Example 4. Pd Impregnated Samples Pd/$Mn_3O_4$: $La_{0.9}MnO_3$ (0.4, 0.2, 0.1, 0.05 and 0.01 wt % Pd)

Pd was deposited onto 20 g composite via incipient wetness impregnation using Pd(NO$_3$)$_2$ solution (7.83% Pd). The samples were dried at 105° C. and fired at 500° C. for 2 h in air. Reference $Ce_{0.5}Zr_{0.5}O_2$ samples were prepared similarly.

Example 5. OSC Data Derived from Fresh and Aged Composites and Comparative Examples OSC was determined by two methods. The methods provide comparable information.

Method 1: In a typical OSC experiment, 0.05 g of the sample is programmed to be cycled between oxidising (50 mL min$^{-1}$ of 5% O$_2$/He) and reducing conditions (50 mL min$^{-1}$ of 100% CO), using 10 mL min$^{-1}$ Ar as a tracer gas and 40 mL min$^{-1}$ He as a carrier gas. A mass spectrometer was used to monitor the CO$_2$ and O$_2$ signals at 500° C. over multiple redox cycles and the OSC is calculated as the area under the CO$_2$ curve for the first 3.5 seconds from where the CO$_2$ starts to be produced.

Method 2: OSC was determined using a CO/CO$_2$ breakthrough test which monitors the CO$_2$ generation from the stored O$_2$ of the catalyst under perturbed conditions. Approximately 0.1 g of catalyst was exposed to alternate lean (10 mL min$^{-1}$ of 5% O$_2$/He for 5 mins) and rich (10 mL min$^{-1}$ of 10% CO/He for 5 mins) gas mixtures using He as a carrier gas (90 mL min$^{-1}$ He). A mass spectrometer was used to monitor the CO$_2$, CO and O$_2$ signals at 500° C. over multiple redox cycles and the OSC calculated either from measuring the time taken between the CO$_2$ and CO breakthrough signals.

The results of the testing are shown in Table 1.

TABLE 1

OSC of composites and comparative examples at 500° C.

| Sample | Redox active metal (wt %) | Fresh OSC at 500° C. (µmol O/g) | Aged OSC at 500° C. (µmol O/g) |
|---|---|---|---|
| $Mn_3O_4$:$La_{0.9}MnO_3$[1] | 22.7 | 1401 | 159 |
| $Mn_2O_3$/aged $Mn_3O_4$ (Mn 100)[2] | 69.6/72.0 | 3644 | 217 |
| $Mn_2O_3$:$Al_2O_3$/aged $Mn_xAl_yO_4$ (Mn:Al 30:70)[2] | 27.8 | 1158 | 125 |
| $La_{0.9}Sr_{0.1}MnO_3$[2] | 23.2 | 438 | |
| $Ce_{0.5}Zr_{0.5}O_2$[1] | 47.4 | 567 | |

[1]Integration of the area underneath the CO$_2$ production curve over 3.5 seconds.
[2]The OSC calculated from measuring the time taken between the CO$_2$ and CO breakthrough signals.

Example 6. Light-Off Testing Procedures for Composites in Example 1

Materials in Example 1 were tested under a continuous gas mix with a typical TWC gas composition. The first ramp is used as a pre-treatment to degreen the samples, while data collected during the second ramp is used to compare the TWC activity. The samples were tested from about 110 to about 550° C. using a ramp rate of 10° C./min. The total flow used was 5 L/min for 0.2 g of catalyst mixed with 0.2 g of cordierite, which was placed in a fix bed reactor. The gases used and their concentrations are presented in Table 2.

TABLE 2

Gas mix composition for the light-off experiments

| | Perturbed SCAT test | |
| --- | --- | --- |
| | Base mix | + pert. line |
| Lambda | 0.99/1.01 | 0.05 |
| Time | 3 sec | 3 sec |
| NO | 2200 ppm | |
| $CO_2$ | 14% | |
| $H_2O$ | 4% | |
| CO | 0.73% | 1.47% |
| $C_3H_6$ | 660 ppm | |
| $C_3H_8$ | 330 ppm | |
| $H_2$ | 0.23% | 0.46% |
| $O_2$ | Dependable on λ | 1% |
| Ramp rate | 10° C./min | |
| Max. Temp. | 500° C. | |
| WHSV | 750 $Lg^{-1}h^{-1}$ | |

Figure 9:
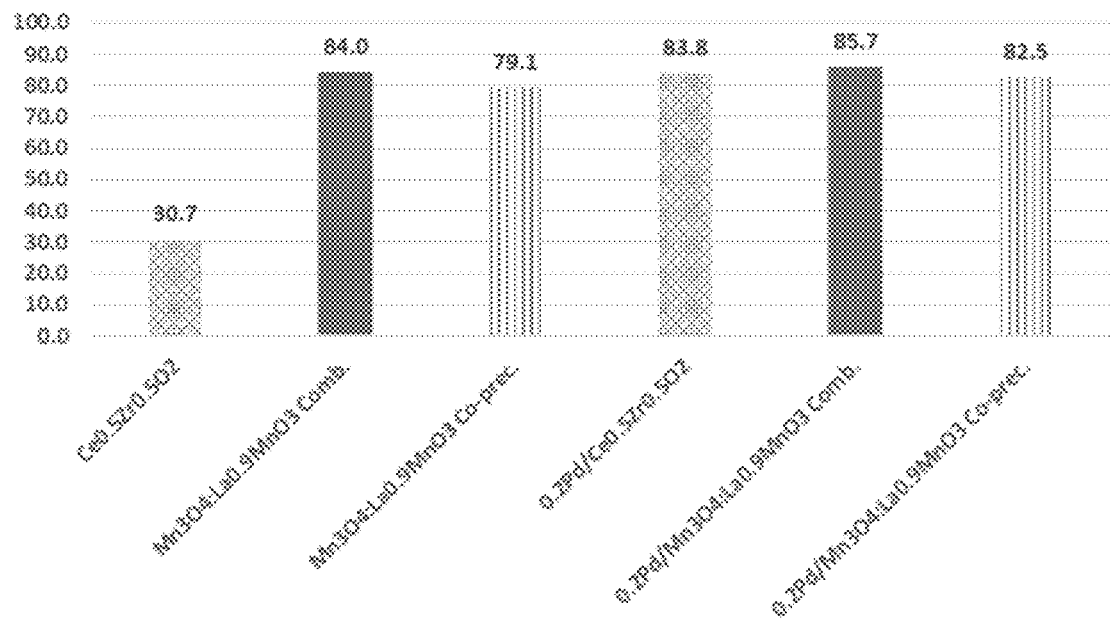
FIG. 9 shows data for CO conversions at 500° C. for various compositions with and without about 0.2 wt % Pd additive.
Figure 10:
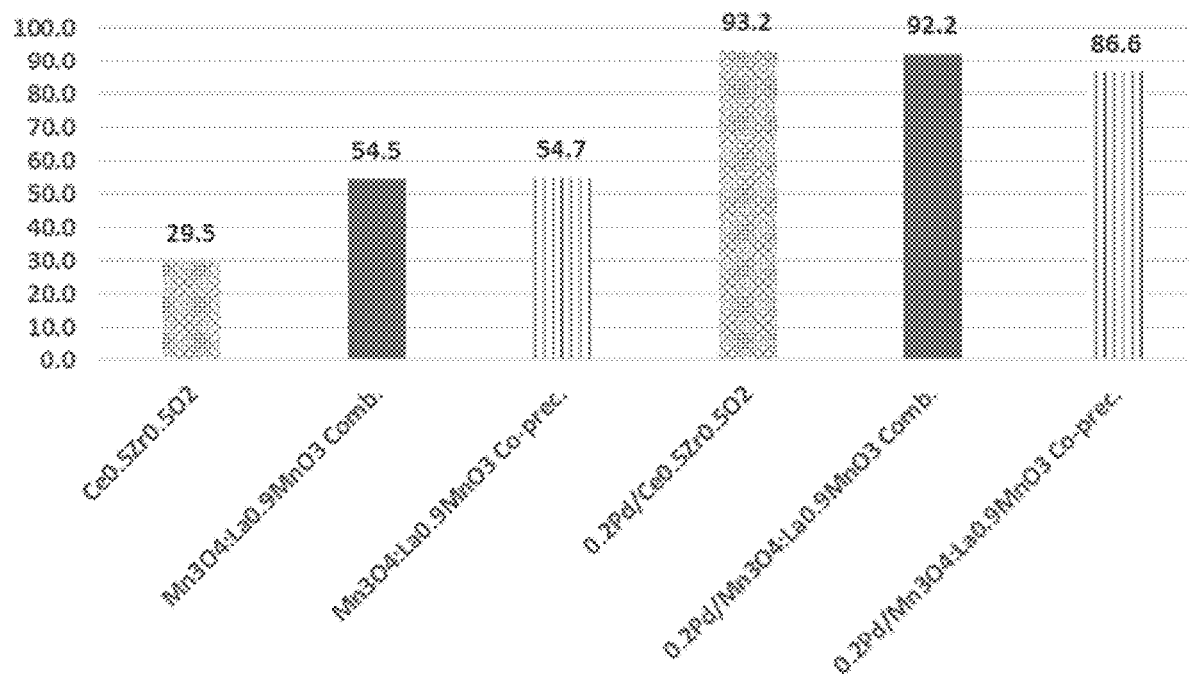
FIG. 10 shows data for HC conversions at 500° C. for various compositions with and without about 0.2 wt % Pd additive ("THC" refers to total hydrocarbon conversion).
Figure 11:
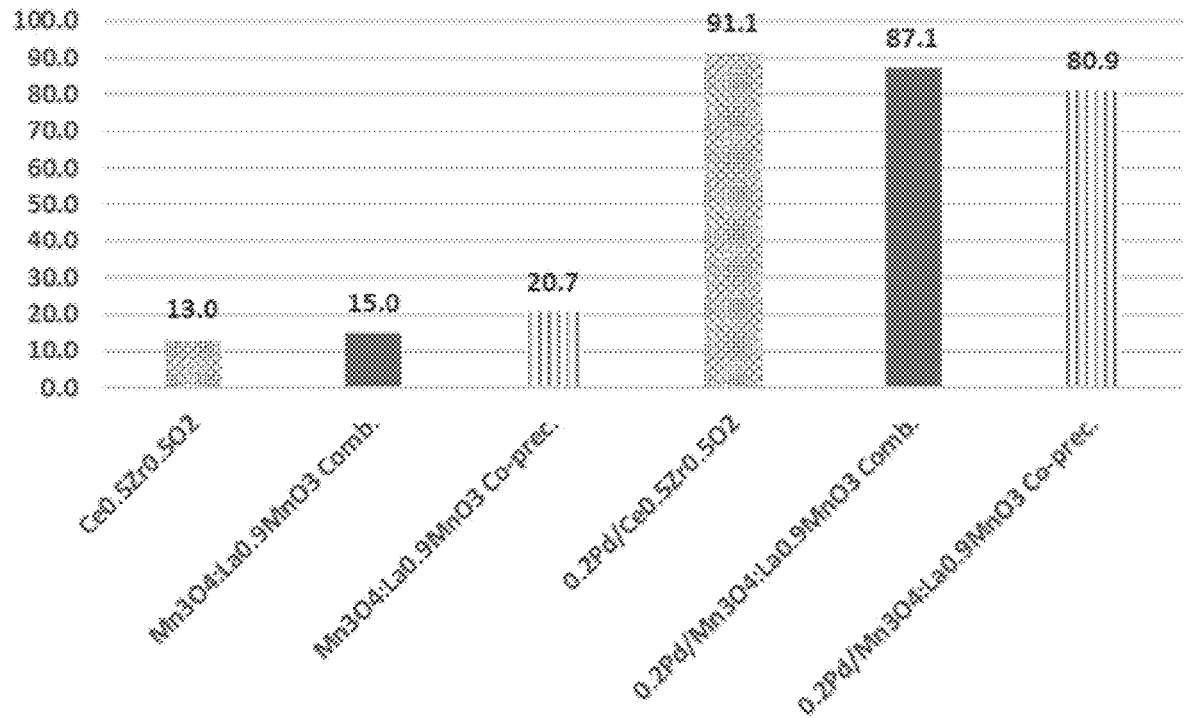
FIG. 11 shows data for NO conversions at 500° C. for various compositions with and without about 0.2 wt % Pd additive.

The results show that the composite has improved $CO/C_3H_6/NO$ activity compared to a reference $Ce_{0.5}Zr_{0.5}O_2$. The NO reduction is poor due to the competition of reactants for adsorption sites and the preference of perovskites for $O_2$ and $H_2O$ adsorption under TWC conditions. To improve NO reduction small amount of Pd was added onto the perovskite surface. For example, in the presence of 0.2 wt % Pd the TWC activity above 400° C. is similar or better than $0.2Pd/Ce_{0.5}Zr_{0.5}O_2$, especially in the case of combusted samples. (FIGS. 9-11). In the presence of 0.2 wt % Pd the NO conversion significantly improved and the TWC activity was comparable to $0.2Pd/Ce_{0.5}Zr_{0.5}O_2$ standards.

Figure 12:
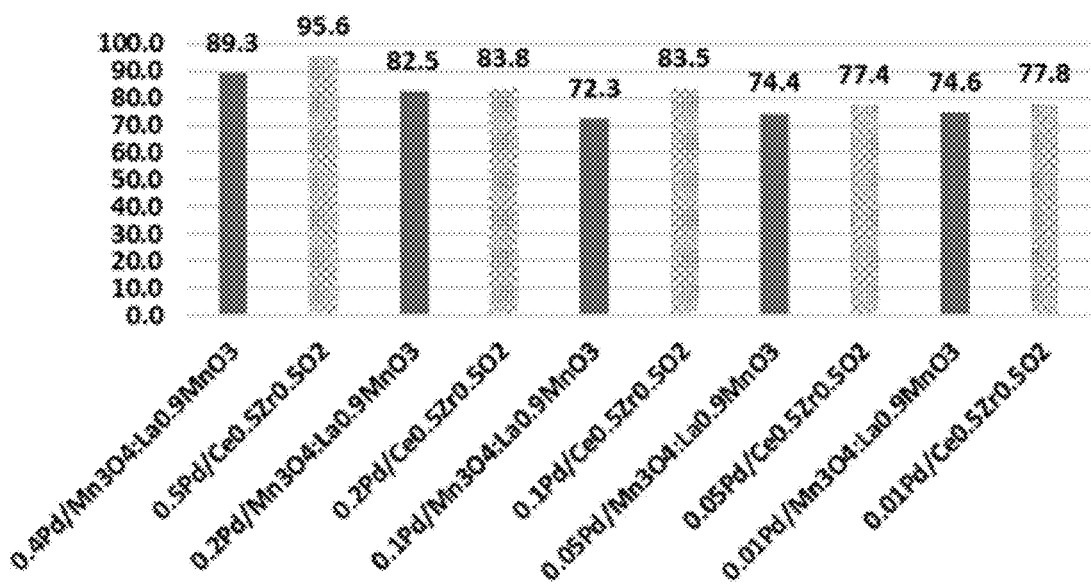
FIG. 12 shows data for CO conversions for various compositions containing Pd additive at 500° C.
Figure 13:
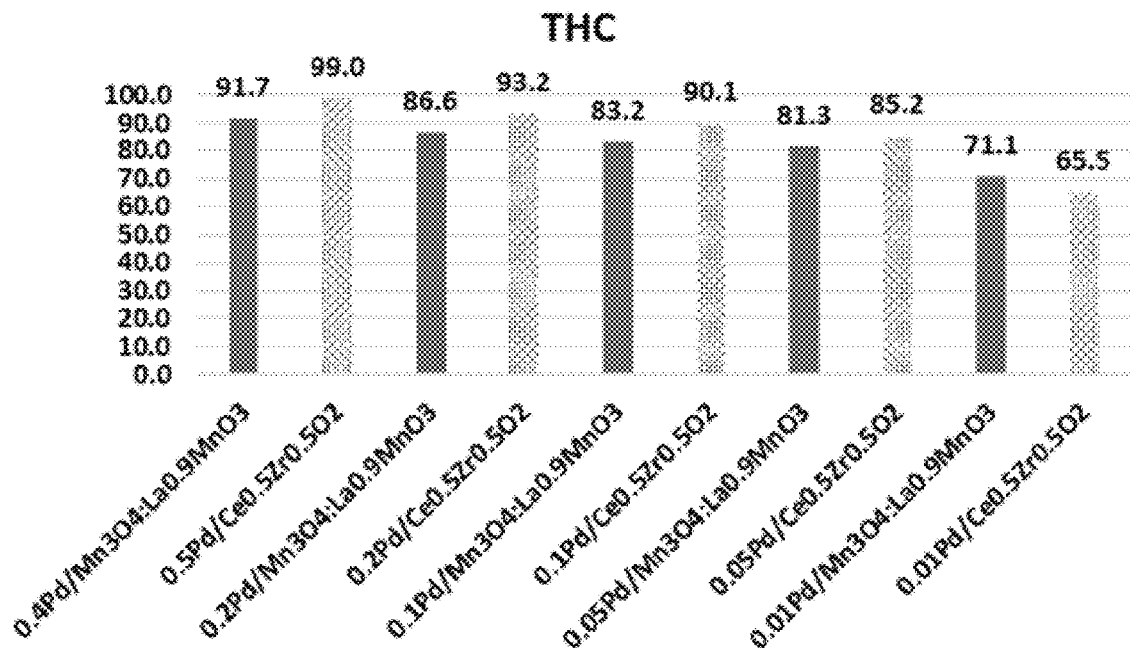
FIG. 13 shows data for HC conversions for various compositions containing Pd additive at 500° C.
Figure 14:
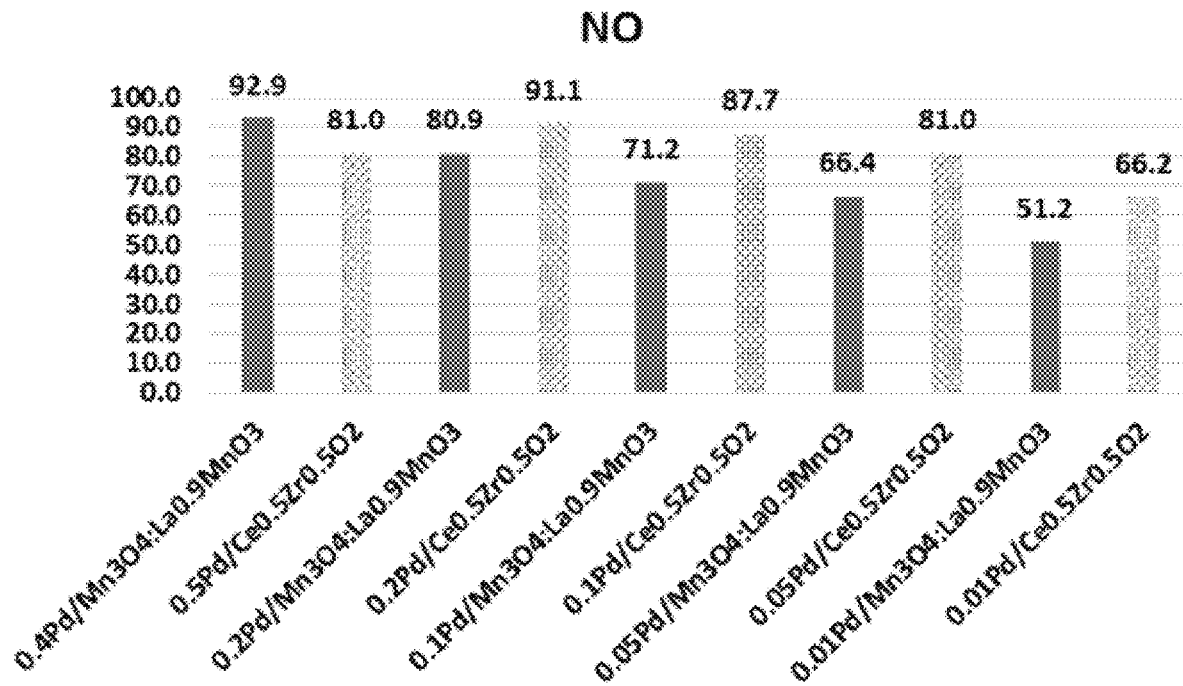
FIG. 14 shows data for NO conversions for various compositions containing Pd additive.

The composites loaded with about 0.01-0.4 wt % Pd at 500° C. convert $CO/C_3H_6/NO$ at an efficiency of at least 85%, but generally more than 90%, relative to a comparable $Pd/Ce_{0.5}Zr_{0.5}O_2$-based composition (FIGS. 12-14).

As those skilled in the art will appreciate, numerous modifications and variations of the present invention are possible considering these teachings, and all such are contemplated hereby.

The disclosures of each patent, patent application, and publication cited or described in this document are hereby incorporated herein by reference, each in its entirety, for all purposes, or at least for the context in which they were used herein.

What is claimed:

1. A composition comprising a composite of aggregated and/or fused primary particles collectively having a formula of $[MnO_x]_y[La_zMnO_3]_{1-y}$;

wherein
x is from about 1 to about 2.5;
y is from about 1 to about 30 wt %;
z is about 0.7 to about 1.1; and
the $La_zMnO_3$ is a crystalline perovskite phase;
and wherein the composite of aggregated and/or fused primary particles has a mean surface area of about 25 to about 60 $m^2/g$.

2. The composition of claim 1, wherein the $MnO_x$ is amorphous.

3. The composition of claim 1, wherein the $MnO_x$ is crystalline.

4. The composition of claim 1, wherein the primary particles independently comprise $MnO_x$ and $La_zMnO_3$.

5. The composition of claim 4, wherein the primary particles of $MnO_x$ are present in a size range of from about 10 nm to about 60 nm, preferably from about 12 nm to about 25 nm, or from about 14 nm to about 50 nm and/or the primary particles of $La_zMnO_3$ are present in a size of from about 10 nm to about 50 nm, preferably from about 12 nm to about 25 nm.

6. The composition of claim 1, wherein the $MnO_x$ is predominantly $Mn_3O_4$, $Mn_5O_8$, or a combination thereof.

7. The composition of claim 1, wherein z is a value in a range of from about 0.7 to about 1.1, from about 0.8 to about 1.1, from about 0.8 to about 0.99, or from about 0.8 to about 0.95.

8. The composition of claim 1, further comprising $La_2O_2CO_3$.

9. The composition of claim 1, further comprising a platinum group metal (PGM) in an amount of about 0.01 wt % to about 0.5 wt %, relative to the weight of the entire composition, preferably where the PGM is Pd, and/or the PGM is situated predominantly on the surface of the primary particles.

10. The composition of claim 1, prepared by:
(a) precipitating a lanthanum-manganese hydroxide precursor from an aqueous solution comprising lanthanum and manganese, the lanthanum and manganese each independently being a salt comprising acetylacetonate, carboxylate, carbonate, halide, nitrate, and/or oxalate, using an alkali metal hydroxide, thereby providing an aqueous suspension having a pH in a range of from about 9 to about 13; then
(b) calcining the lanthanum-manganese hydroxide at a temperature in a range of from about 600° C. to about 1100° C.; and then optionally
(c) depositing the PGM onto the composition particles.

11. An automotive catalytic converter comprising a washcoat, the washcoat comprising a composition of claim 1.

12. An oxygen storage device comprising a three-way catalyst comprising the composition of claim 1.

13. A three-way catalyst comprising a composition of claim 1, wherein the composition independently exhibits efficiencies for the conversion of hydrocarbon (HC), CO, and NOx of at least 85% relative to a comparable $Ce_{0.5}Zr_{0.5}O_2$-based composition when operated at a temperature in a range of from about 350° C. to about 550° C.

14. A method of treating an exhaust gas from an internal combustion engine, the method comprising contacting the exhaust gas with a three-way catalyst of claim 13.

* * * * *